United States Patent [19]

Fukuda et al.

[11] Patent Number: 5,743,066
[45] Date of Patent: Apr. 28, 1998

[54] LONGITUDINAL SEALER FOR BAG MAKER-PACKAGING MACHINE

[75] Inventors: Masao Fukuda; Yukio Nakagawa, both of Shiga, Japan

[73] Assignee: Ishida Co., Ltd., Kyoto, Japan

[21] Appl. No.: 678,640

[22] Filed: Jul. 10, 1996

[30] Foreign Application Priority Data

Aug. 18, 1995 [JP] Japan ................................. 7-233384

[51] Int. Cl.$^6$ .......................... B65B 51/26; B65B 9/20; B65B 51/18
[52] U.S. Cl. ........................ 53/64; 53/65; 53/551; 53/376.2; 493/31; 493/302; 156/358; 156/359
[58] Field of Search .................... 53/75, 77, 550, 53/551, 552, 375.9, 376.2, 64, 65, 52; 493/31, 36, 38, 302, 5; 156/324, 350, 358, 359

[56] References Cited

U.S. PATENT DOCUMENTS

| | | | |
|---|---|---|---|
| 3,001,341 | 9/1961 | Wing | 53/77 X |
| 3,526,079 | 9/1970 | Maxeiner et al. | 53/551 |
| 3,982,380 | 9/1976 | Seragnoli | 53/77 |
| 3,984,963 | 10/1976 | Seragnoli | 53/77 |
| 4,128,985 | 12/1978 | Simmons | 53/77 X |
| 4,555,289 | 11/1985 | Kreager | 53/551 X |
| 5,377,474 | 1/1995 | Kovacs et al. | 53/551 X |
| 5,463,850 | 11/1995 | Fukuda | 53/551 |
| 5,551,206 | 9/1996 | Fukuda | 53/551 X |

Primary Examiner—Horace M. Culver

[57] ABSTRACT

A longitudinal sealer for a bag maker-packaging machine is controlled such that when an abnormal condition is detected and the operation of the machine is stopped temporarily and then restarted after the abnormal condition is removed, the mechanism for moving the film and the heater for heating edge parts of the film to seal them together are deactivated and reactivated, but not both at the same time. Deactivation of the heater is delayed after that of the mechanism for moving the fill and/or reactivation of the movement of the film is delayed after that of the heater such that the film is certain to be longitudinally well sealed in spite of the interruption of the sealing operation.

22 Claims, 4 Drawing Sheets

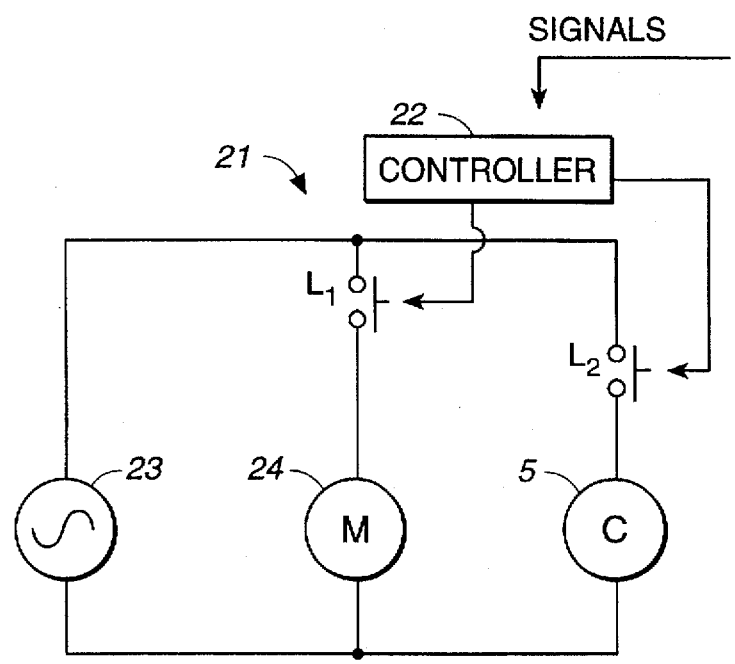
FIG._1
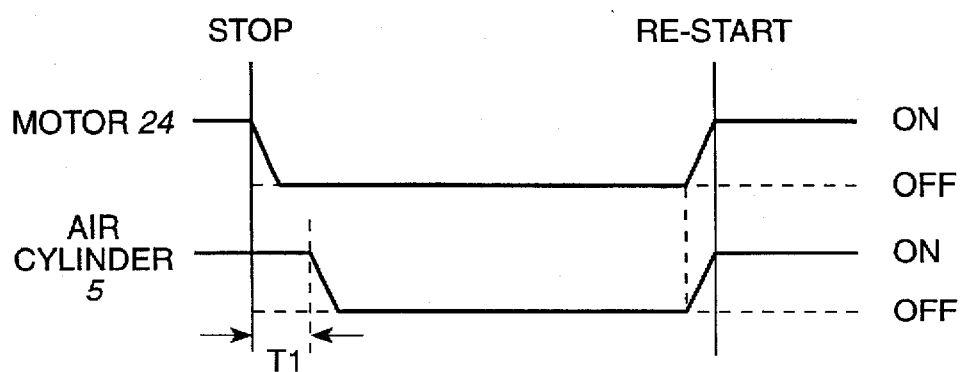
FIG._2

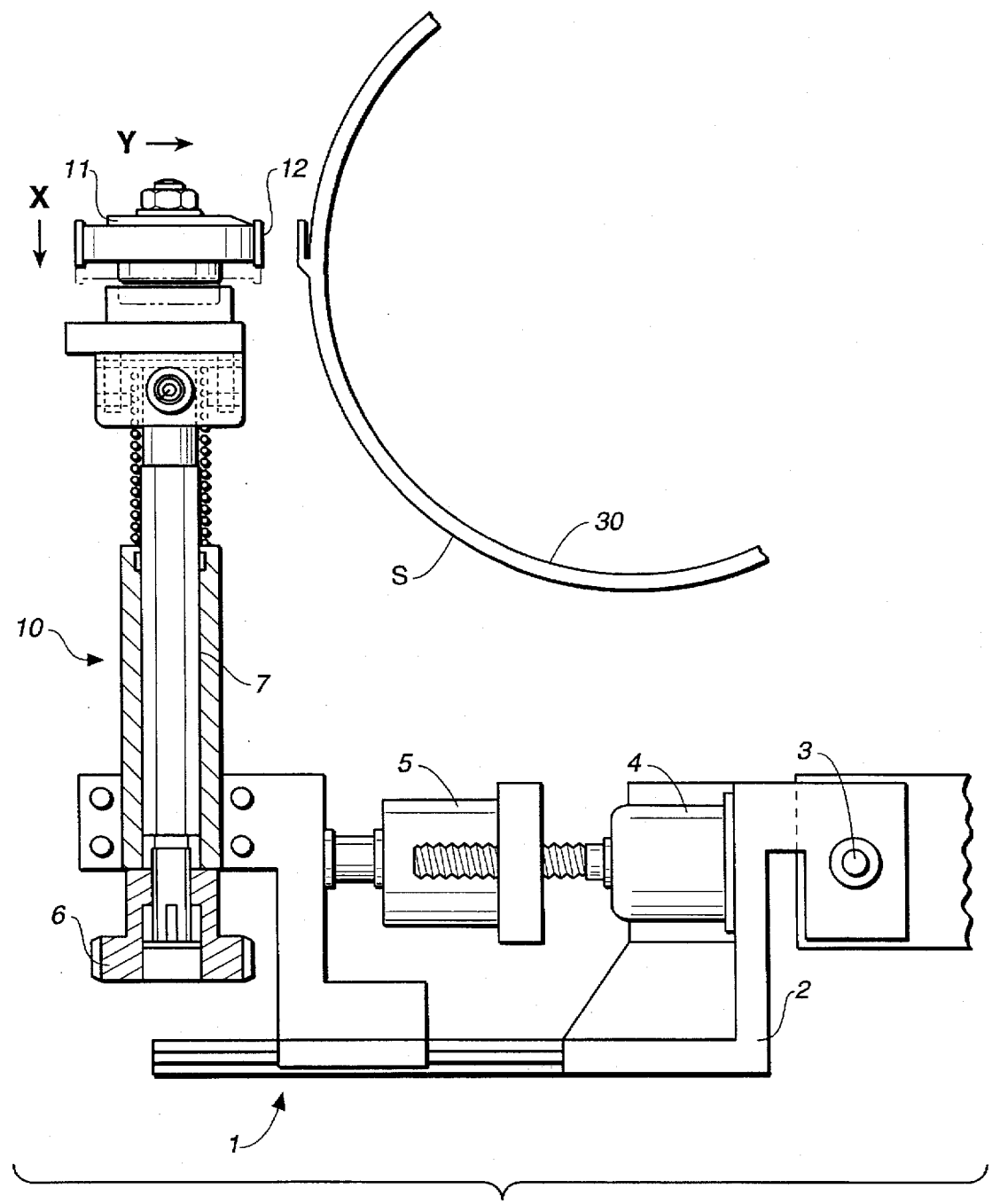
FIG._3

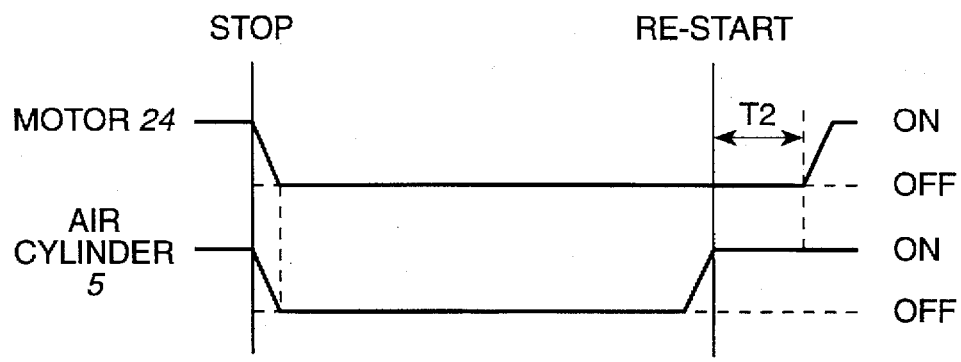
FIG._4
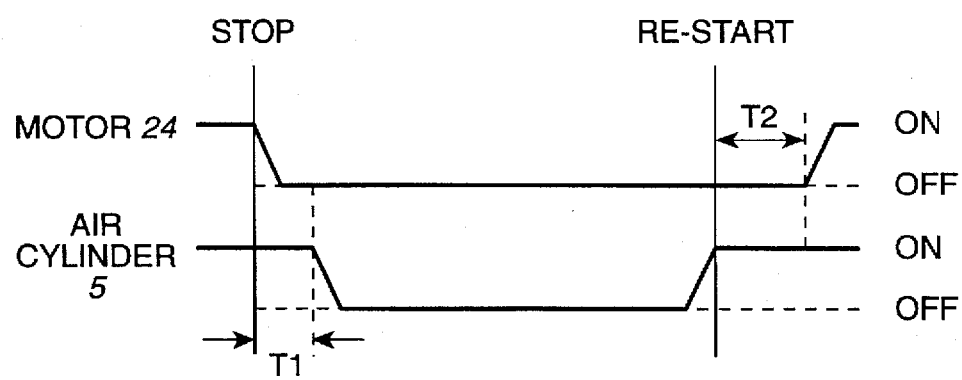
FIG._5

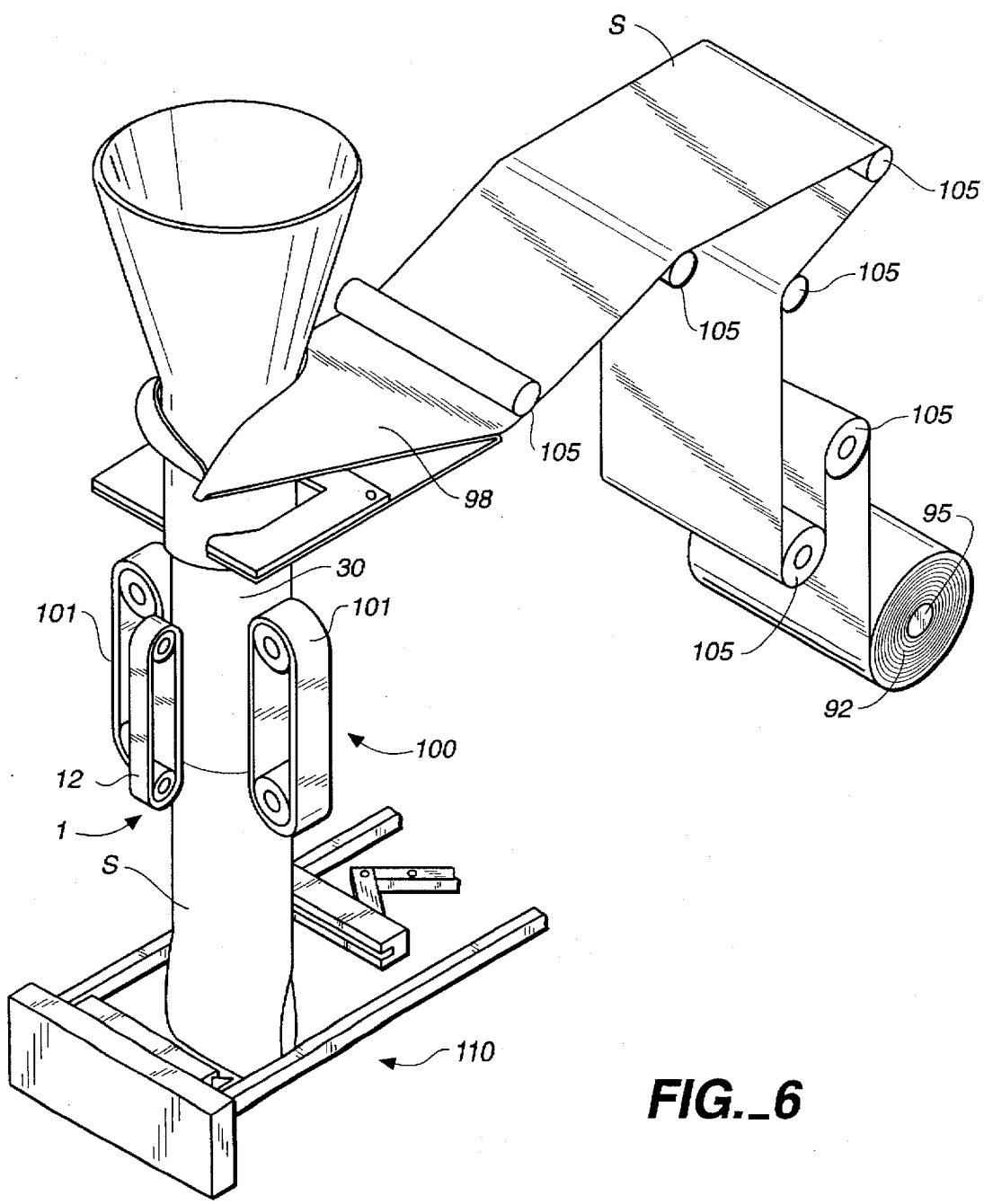
FIG._6

LONGITUDINAL SEALER FOR BAG MAKER-PACKAGING MACHINE

BACKGROUND OF THE INVENTION

This invention relates to a mechanism for longitudinally sealing an elongated bag-making material for a bag maker-packaging machine.

A bag maker-packaging machine of a so-called vertical pillow type, adapted to bend a thermoplastic flexible web of bag-making material (hereinafter referred to as "the film"), while transporting it along the peripheral surface of a filling cylinder and sealing together the mutually overlapping side edges of the film, and to have it transversely sealed by a transverse sealer, is generally provided with a longitudinal sealer comprising a heater belt such that the filling of a bag with articles and sealing of the bag can be carried out in one continuous series of operations. Once a packaging machine of this type is started, the supply of film is usually not interrupted unless an abnormal situation is detected. In Japanese Patent Publication Tokkai 6-239318, the present inventor disclosed a mechanism for moving the heater belt towards or away from the film such that the packaging machine can be stopped in the case of an abnormal situation after the heater belt is temporarily retracted from the film. Production of empty bags in such a situation can thus be prevented. When such a packaging machine is restarted after the cause of the abnormal situation is removed, however, the first package to be produced thereby may not be sealed sufficiently well in the longitudinal direction, and the bag may break and scatter around its contents.

SUMMARY OF THE INVENTION

It is therefore an object of this invention to prevent the occurrence of this type by providing a longitudinal sealer for a bag maker-packaging machine which can produce longitudinally well sealed packages when the machine is re-started after its operation is interrupted by the occurrence of an abnormal situation.

Longitudinal sealers embodying this invention, with which the above and other objects can be accomplished, may be characterized as comprising not only film driving means for transporting a thermoplastic bag-forming film longitudinally and heating means for applying heat to edge parts of the film to thereby longitudinally seal them together, but also control means adapted, when an abnormal situation is detected and the operation of the packaging machine is stopped accordingly and is re-started after the abnormal condition is removed, to deactivate and reactivate the film driving means and the heating means one after the other at the time of deactivation and/or at the time of reactivation such that the portion of the film which was in contact with the heating means while the film was being stopped is certain to be well sealed.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a block diagram of a control circuit for a longitudinal sealer embodying this invention;

FIG. 2 is a time chart showing its operations;

FIG. 3 is a sectional plan view of a longitudinal sealer incorporating this invention;

FIG. 4 is a time chart showing the operation according to another control mode;

FIG. 5 is a time chart showing still another mode of operation; and

FIG. 6 is a schematic diagonal view of a portion of a bag maker-packaging machine incorporating a longitudinal sealer embodying this invention.

DETAILED DESCRIPTION OF THE INVENTION

FIG. 6 shows a vertical pillow type bag maker-packaging machine incorporating a longitudinal sealer (only schematically shown at 1) controlled according to this invention. A flexible, elongated thermoplastic bag-making material ("the film S") is originally in the form of a web roll 92 supported around a shaft 95 (serving as web supporting means). The film S is pulled out of the web roll 92, is guided by a plurality of guide rolls (including dancer rollers) 105 to a former 98, below which is attached a filling cylinder 30. The function of the former 98 is to bend the film S into a tubular shape around the filling cylinder 30. A film-pulling unit 100 including a pair of pull-down belts 101 is provided to pull the film S downward after the film S is formed into the tubular form around the filling cylinder 30. The longitudinal sealer 1, to be described more in detail below, seals the mutually overlapping side edge parts of the film S, and after a batch of articles to be packaged is dropped through the filling cylinder 30 into a bag which is being formed, the film S is sealed horizontally (or transversely to the direction of the downward motion of the film S) by a transverse sealer 110. The control unit for controlling the motions of various components of the bag maker-packaging machine is not shown in FIG. 6.

FIG. 3 shows more in detail the longitudinal sealer 1 embodying the present invention, comprising, as disclosed in aforementioned Japanese Patent Publication Tokkai 6-239318, a seal unit 10 which, including a seal heater 11 and a seal belt 12, can be separated from the filling cylinder 30 when, for example, the latter is to be replaced. For this purpose, the seal unit 10 is attached to a swing arm 2 which is supported so as to be not only rotatable around a support pin 3 but also slidable therealong by means of a position-adjusting motor 4 such that the position of the seal unit 10 along the swing arm 2 can be adjusted according to the size of the filling cylinder 30. A heater-moving air cylinder 5 is inserted between the position-adjusting motor 4 and the seal unit 10 for releasing the compressive pressure of the seal belt 12 when the machine is stopped. A knob 6 is provided for changing the position of the seal heater 11 along the X-axis shown in FIG. 3, and a sleeve 7 is made rotatable such that the contact angle of the seal belt 12 with the film S can be varied.

FIG. 1 shows a control circuit for the sealer described above, including a driver circuit 21 for the aforementioned heater-releasing air cylinder 5 and a film-pulling motor 24 for pulling down the film S, which are connected in parallel to each other with respect to a power source 23, a (first) relay L1 being connected in series with the film-pulling motor 24 and another (second) relay L2 being connected in series with the heater-moving air cylinder 5. These two relays L1 and L2 are controlled by a controller 22, which serves not only to set delay times (to be explained below) on the basis of data to be inputted from external input means (not shown), such as the thickness of the film S, the speed of transporting packages and the heater temperature, but also to output a signal for switching off the first relay L1 and/or the second relay L2 in response to any detection signal received from a detector (not shown) for detecting an abnormal condition which requires the operation of the packaging machine to be temporarily stopped. When the first relay L1 is switched off, the downward motion of the film will be stopped. When the second relay L2 is switched off, the heater-moving air cylinder 5 is deactivated and the seal heater 11 is removed away from the film S.

FIG. 2 shows the operation of the controller 22 according to a first embodiment of the invention. When, for example, a detector detects that articles to be packaged are not being supplied and outputs a detection signal indicative of the occurrence of this abnormal situation, the controller 22 immediately outputs a signal to switch off the first relay L1, thereby stopping the motion of the film-pulling motor 24, but the second relay L2 is kept in the ON position for the duration of a specified delay time T1 and is switched off after this delay time T1 has elapsed.

The reason for effecting this delay is as follows. As is well known, as described in aforementioned Japanese Patent Publication Tokkai 6-239318, longitudinal sealing is effected while the mutually overlapping side edge parts of the film S are in contact with the seal belt 12 over a finite longitudinal distance. Thus, the sealing conditions such as the temperature of the seal heater 11, the speed of motion of the film S (or that of the seal belt 12) and the compressive force between the seal belt 12 and the film S are determined such that longitudinal sealing can be dependably effected while the downwardly moving film S travels the aforementioned distance. If the first relay L1 is switched off and the film S is stopped, lower parts of the film S near the bottom of the area then in contact with the seal belt 12 are expected to be nearly completely sealed already but upper parts of the film near the top of the area which was then in contact with the seal belt 12 have hardly received any heat. The purpose of continuing to keep the seal belt 12 in contact with the film S for an extra period of T1 even after the downward motion of the film is stopped is to complete the longitudinal sealing of all parts of the film then in contact with the seal belt 12. By this extra heating, the lower parts will receive more heat than normally required, but it is less unacceptable to produce a bag with a portion somewhat overly heated than to produce an incompletely sealed bag which is likely to break open. The delay time T1 should therefore be determined such that the sealing will be satisfactorily completed but the film will not be burned or destroyed by the extra heating.

After the abnormal condition has been removed, for example, by replenishing articles to be packaged in the hopper (not shown) above the filling cylinder 30, a start signal is inputted to the controller 22, causing the controller 22 to switch on both relays L1 and L2, as shown in FIG. 2, thereby starting the motion of the film S and its heating (sealing) at the same time.

FIG. 4 shows another manner in which the controller 22 may be programmed. According to this program, both relays L1 and L2 are switched off together immediately after the controller 22 receives a detection signal indicative of an abnormal occurrence. After the abnormal condition has been removed and a start signal is inputted to the controller 22, the controller 22 switches on the second relay L2 to activate the heater-moving air cylinder 5 without yet re-starting the downward motion of the film S. It is only after a specified delay time period of T2 has elapsed that the first relay L1 is also switched on to activate the film-pulling motor 24. The delay time period T2, like the time period T1 in the first embodiment of the invention described with reference to FIG. 2, is determined according to the conditions such as the room temperature, the size and thickness of the film S, the temperature of the seal heater 11 and the speed of the film motion.

FIG. 5 shows still another manner in which the controller 22 may be programmed. This is a combination of the first two embodiments of the invention described above in that only the first relay L1 is switched off when a detection signal is received by the controller 22 to stop the motion of the film S, that the second relay L2 is not switched off until a time period of T1 elapses, and that the second relay L2 is switched on before the first relay L1 by a delay time period of T2 after the cause of abnormality is removed. In this example, too, the delay time periods T1 and T2 are determined, depending on various factors such as the room temperature, the size and thickness of the film, the temperature of the seal heater 11 and the speed of the film motion.

In summary, longitudinal sealers according to this invention are adapted to delay the switching off and/or on of either the application of heat or the downward motion of the film at the time of an abnormal situation and at the time of restarting the operation so as to prevent the production of an imperfectly sealed bag by the interruption of operation due to the abnormal situation.

What is claimed is:

1. A longitudinal sealer for a bag maker-packaging machine, said longitudinal sealer comprising:

film driving means for transporting a bag-forming film longitudinally;

heating means for applying heat to edge parts of said film to thereby longitudinally seal said edge parts together; and control means for deactivating said film driving means immediately upon receiving an abnormality detecting signal while maintaining said heating means activated for a delay time necessary to seal said edge parts together and deactivating said heating means thereafter.

2. The longitudinal sealer of claim 1 further comprising heater moving means for moving said heating means selectively either to contact said film or to separate away from said film, said control means causing said heater moving means to move said heating means away from said film when deactivating said heating means.

3. The longitudinal sealer of claim 1 wherein said control means is adapted to restart said film driving means and said heating means at a same time in response to a restart signal after said film driving means and said heating means are deactivated temporarily in response to said abnormality detecting signal.

4. The longitudinal sealer of claim 1 wherein said control means determines said delay time from inputted data, said inputted data including the thickness and size of said film, the temperature of said heating means and the speed by which said film driving means pulls said film.

5. A longitudinal sealer for a bag maker-packaging machine, said longitudinal sealer comprising:

film driving means for transporting a bag-forming film longitudinally;

heating means for applying heat to edge parts of said film to thereby longitudinally seal said edge parts together; and control means for restarting said longitudinal sealer in response to a restart signal, after an operation thereof has been interrupted, by first reactivating said heating means for a preheating period of time necessary to seal said edge parts together and then reactivating said film driving means.

6. The longitudinal sealer of claim 5 wherein said control means determines said preheating period of time from inputted data, said inputted data including the thickness and size of said film, the temperature of said heating means and the speed by which said film driving means pulls said film.

7. The longitudinal sealer of claim 5 wherein said control means is adapted to deactivate said film driving means and said heating means at a same time immediately in response to an abnormality detecting signal outputted when an abnormal condition is detected.

8. The longitudinal sealer of claim 5 further comprising heater moving means for moving said heating means selectively either to contact said film or to separate away from said film, said control means causing said heater moving means to move said heating means away from said film when deactivating said heating means.

9. The longitudinal sealer of claim 1 wherein said control means is further adapted to restart said longitudinal sealer in response to a restart signal, after an operation thereof has been interrupted, by first reactivating said heating means for a preheating period of time necessary to seal said edge parts together and then reactivating said film driving means.

10. The longitudinal sealer of claim 9 wherein said control means determines said delay time and said preheating period of time from inputted data, said inputted data including the thickness and size of said film, the temperature of said heating means and the speed by which said film driving means pulls said film.

11. The longitudinal sealer of claim 9 further comprising heater moving means for moving said heating means selectively either to contact said film or to separate away from said film, said control means causing said heater moving means to move said heating means away from said film when deactivating said heating means.

12. A bag maker-packaging machine adapted to bend an elongated bag-making film into a tubular shape to form a bag and to simultaneously fill said bag with a batch of articles, said bag maker-packaging machine comprising:

a web supporting means supporting a web roll having a web of said elongated film wound around a core shaft;

a former for forming said web into a tubular shape;

web guiding means for guiding said web from said web roll to said former and said tubularly formed film on a longitudinal downward film path;

a longitudinal sealer for sealing side edges of said tubularly formed film longitudinally;

a film pulling means for causing said film to move on said downward film path; and a transverse sealer for sealing said tubularly formed film transversely to said film path;

said longitudinal sealer comprising:

film driving means for transporting a bag-forming film longitudinally;

heating means for applying heat to edge parts of said film to thereby longitudinally seal said edge parts together; and control means for deactivating said film driving means immediately upon receiving an abnormality detecting signal while maintaining said heating means activated for a delay time necessary to seal said edge parts together and deactivating said heating means thereafter.

13. The bag maker-packaging machine of claim 12 wherein said longitudinal sealer further comprises heater moving means for moving said heating means selectively either to contact said film or to separate away from said film, said control means causing said heater moving means to move said heating means away from said film when deactivating said heating means.

14. The bag maker-packaging machine of claim 12 wherein said control means is adapted to restart said film driving means and said heating means at a same time in response to a restart signal after said film driving means and said heating means are deactivated temporarily in response to said abnormality detecting signal.

15. The bag maker-packaging machine of claim 12 wherein said control means determines said delay time from inputted data, said inputted data including the thickness and size of said film, the temperature of said heating means and the speed by which said film driving means pulls said film.

16. A bag maker-packaging machine adapted to bend an elongated bag-making film into a tubular shape to form a bag and to simultaneously fill said bag with a batch of articles, said bag maker-packaging machine comprising:

a web supporting means supporting a web roll having a web of said elongated film wound around a core shaft;

a former for forming said web into a tubular shape;

web guiding means for guiding said web from said web roll to said former and said tubularly formed film on a longitudinal downward film path;

a longitudinal sealer for sealing side edges of said tubularly formed film longitudinally;

a film pulling means for causing said film to move on said downward film path; and a transverse sealer for sealing said tubularly formed film transversely to said film path;

said longitudinal sealer comprising:

film driving means for transporting a bag-forming film longitudinally;

heating means for applying heat to edge parts of said film to thereby longitudinally seal said edge parts together; and control means for restarting said longitudinal sealer in response to a restart signal, after an operation thereof has been interrupted, by first reactivating said heating means for a preheating period of time necessary to seal said edge parts together and then reactivating said film driving means.

17. The bag maker-packaging machine of claim 16 wherein said control means determines said preheating period of time from inputted data, said inputted data including the thickness and size of said film, the temperature of said heating means and the speed by which said film driving means pulls said film.

18. The bag maker-packaging machine of claim 16 wherein said control means is adapted to deactivate said film driving means and said heating means at a same time immediately in response to an abnormality detecting signal outputted when an abnormal condition is detected.

19. The bag maker-packaging machine of claim 16 wherein said longitudinal sealer further comprises heater moving means for moving said heating means selectively either to contact said film or to separate away from said film, said control means causing said heater moving means to move said heating means away from said film when deactivating said heating means.

20. The bag maker-packaging machine of claim 12 wherein said control means is further adapted to restart said longitudinal sealer in response to a restart signal, after an operation thereof has been interrupted, by first reactivating said heating means for a preheating period of time necessary to seal said edge parts together and then reactivating said film driving means.

21. The bag maker-packaging machine of claim 12 wherein said control means determines said delay time and said preheating period of time from inputted data, said inputted data including the thickness and size of said film, the temperature of said heating means and the speed by which said film driving means pulls said film.

22. The bag maker-packaging machine of claim 12 wherein said longitudinal sealer further comprises heater moving means for moving said heating means selectively either to contact said film or to separate away from said film, said control means causing said heater moving means to move said heating means away from said film when deactivating said heating means.

* * * * *